(12) United States Patent
Lasserre et al.

(10) Patent No.: US 11,178,412 B2
(45) Date of Patent: Nov. 16, 2021

(54) METHOD AND APPARATUS OF ENCODING AND DECODING A COLOR PICTURE

(71) Applicant: INTERDIGITAL VC HOLDINGS, INC., Wilmington, DE (US)

(72) Inventors: Sebastien Lasserre, Cesson-Sevigne (FR); Pierre Andrivon, Cesson-Sevigne (FR); Fabrice Leleannec, Cesson-Sevigne (FR); David Touze, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/408,639

(22) Filed: May 10, 2019

(65) Prior Publication Data

US 2019/0268610 A1 Aug. 29, 2019

Related U.S. Application Data

(63) Continuation of application No. 15/547,512, filed as application No. PCT/EP2016/051449 on Jan. 25, 2016, now Pat. No. 10,390,027.

(30) Foreign Application Priority Data

Jan. 30, 2015 (EP) ..................................... 15305125
Oct. 9, 2015 (EP) ..................................... 15306607

(51) Int. Cl.
*H04N 19/186* (2014.01)
*H04N 19/30* (2014.01)
(Continued)

(52) U.S. Cl.
CPC .......... *H04N 19/186* (2014.11); *H04N 19/00* (2013.01); *H04N 19/30* (2014.11); *H04N 19/85* (2014.11);
(Continued)

(58) Field of Classification Search
None
See application file for complete search history.

(56) References Cited

U.S. PATENT DOCUMENTS 6,078,357 A * 6/2000 Yamamoto ............. H04N 5/235
348/234
6,975,767 B1 * 12/2005 Clark .................... H04N 19/186
375/E7.185
(Continued)

FOREIGN PATENT DOCUMENTS

CN 103503429 1/2014
CN 103843058 6/2014
(Continued)

OTHER PUBLICATIONS

Malvar, Henrique S., Gary J. Sullivan, and Sridhar Srinivasan. "Lifting-based reversible color transformations for image compression." Applications of Digital Image Processing XXXI. vol. 7073. International Society for Optics and Photonics, 2008. (Year: 2008).*
(Continued)

*Primary Examiner* — Michelle M Entezari
(74) *Attorney, Agent, or Firm* — Invention Mine LLC

(57) ABSTRACT

The present disclosure generally relates to a method and device of encoding a color picture having color components (Ec) comprising obtaining (11) a luminance component (L) and two chrominance components (C1, C2) from the color picture to be encoded. The method for encoding a color picture having color components comprising obtaining at least one chrominance component from the color picture to be encoded, characterized in that the method further comprises:
  determining a first factor based on the value of each pixel (i) of said luminance component;
  obtaining at least one final chrominance component by scaling said at least one chrominance component by said first factor; and
(Continued)

encoding (13) said at least one final chrominance component.

32 Claims, 5 Drawing Sheets

(51) Int. Cl.
    *H04N 19/85*     (2014.01)
    *H04N 19/00*     (2014.01)
    *H04N 19/98*     (2014.01)

(52) U.S. Cl.
    CPC ..... *H04N 19/98* (2014.11); *G09G 2320/0271* (2013.01); *G09G 2340/0428* (2013.01); *G09G 2360/16* (2013.01)

(56) References Cited

U.S. PATENT DOCUMENTS

| | | | |
|---|---|---|---|
| 6,980,598 B2* | 12/2005 | Greenfield | H04N 19/61 375/240.29 |
| 7,106,352 B2 | 9/2006 | Deering | |
| 7,558,436 B2 | 7/2009 | Zuro | |
| 8,014,445 B2 | 9/2011 | Segall | |
| 8,731,287 B2 | 5/2014 | Su | |
| 9,480,434 B2 | 11/2016 | De Haan et al. | |
| 9,584,811 B2 | 2/2017 | Su | |
| 10,390,027 B2 | 8/2019 | Lasserre | |
| 10,462,334 B2* | 10/2019 | Mahmalat | H04N 19/186 |
| 10,542,296 B2* | 1/2020 | Lu | H04N 19/46 |
| 10,681,358 B2* | 6/2020 | Rusanovskyy | H04N 19/176 |
| 10,863,201 B2* | 12/2020 | Mertens | G09G 5/10 |
| 2002/0171663 A1 | 11/2002 | Kobayashi | |
| 2007/0091213 A1 | 4/2007 | Jaspers | |
| 2008/0175495 A1 | 7/2008 | Segall | |
| 2009/0167955 A1* | 7/2009 | Pettitt | H04N 9/67 348/649 |
| 2010/0066762 A1* | 3/2010 | Yeh | G06T 11/00 345/629 |
| 2010/0103200 A1 | 4/2010 | Langendijk | |
| 2010/0166301 A1 | 7/2010 | Jeon | |
| 2011/0194618 A1 | 8/2011 | Gish | |
| 2013/0108183 A1 | 5/2013 | Bruls | |
| 2013/0188696 A1 | 7/2013 | Liu | |
| 2013/0287308 A1* | 10/2013 | Salvucci | H04N 19/186 382/232 |
| 2014/0037206 A1 | 2/2014 | Newton | |
| 2014/0086321 A1 | 3/2014 | Efremov et al. | |
| 2014/0210847 A1 | 7/2014 | Knibbeler | |
| 2014/0247870 A1 | 9/2014 | Mertens | |
| 2014/0327822 A1 | 11/2014 | Gish | |
| 2015/0003749 A1 | 1/2015 | Kim | |
| 2015/0016735 A1 | 1/2015 | Kikuchi | |
| 2015/0221280 A1 | 8/2015 | Van Der Vleuten | |
| 2015/0358646 A1 | 12/2015 | Mertens | |
| 2016/0134872 A1 | 5/2016 | Su | |
| 2016/0253792 A1 | 9/2016 | Xu | |

FOREIGN PATENT DOCUMENTS

| | | |
|---|---|---|
| CN | 105324997 | 2/2016 |
| EP | 2890129 | 7/2015 |
| EP | 2958327 | 12/2015 |
| JP | H11313338 | 11/1999 |
| JP | 2002204373 | 7/2002 |
| RU | 2504011 C2 | 1/2014 |
| WO | WO2010105036 A1 | 9/2010 |
| WO | WO2012122426 | 9/2012 |
| WO | 2012142589 | 10/2012 |
| WO | 2013103522 | 7/2013 |
| WO | 2014009844 | 1/2014 |
| WO | WO2014077827 | 5/2014 |
| WO | 2014128586 | 8/2014 |
| WO | 2014128586 A1 | 8/2014 |
| WO | WO2014204865 | 12/2014 |
| WO | WO2014204865 A1 | 12/2014 |
| WO | 2015097118 | 7/2015 |

OTHER PUBLICATIONS

Boitard, Ronan, Mahsa T. Pourazad, and Panos Nasiopoulos. "Chroma scaling for high dynamic range video compression." 2016 IEEE International Conference on Acoustics, Speech and Signal Processing (ICASSP). IEEE, 2016. (Year: 2016).*

Lu, Taoran, et al. "Compression efficiency improvement over HEVC main 10 profile for HDR and WCG content." 2016 Data Compression Conference (DCC). IEEE, 2016. (Year: 2016).*

International Search Report and Written Opinion of the International Searching Authority for PCT/EP2016/051449, dated Apr. 5, 2016.

International Preliminary Report on Patentability for PCT/EP2016/051449 dated Aug. 1, 2017, 12 pages.

Lasserre, S., et. al., "Modulation-based HOR video coding with SOR backward compatibility", Joint Collaborative Team on Video Coding {JCT-VC) of ITU-T SG 16 WP 3 and 1S0/IEC JTC 1/SC 29/WG 11, 21st Meeting, Jun. 2015.

Lasserre et al., "Single Layer Low-Bit Depth EDR Video Coding with SDR/HDR Backward Compatibilities". International Organization for Standardization, Coding of Moving Pictures and Audio, ISO/IEC JTC1/SC29/WG11 MPEG2014/ M36083, Feb. 2015, pp. 7 pages.

Boyce, Jill, et. al., "Draft High Efficiency Video Coding (HEVC) Version 2, Combined Format Range Extensions (RExt), Scalability (SHVC), and Multi-View (MV-HEVC) Extensions". Joint Collaborative Team on Video Coding (JCT-VC), Document No. JCTVC-R1013_v6, Jul. 2014, 535 pages.

International Telecommunication Union, "Conformance Specification for ITU-T H.265 High Efficiency Video Coding". Series H: Audiovisual and Multimedia Systems; Infrastructure of Audiovisual Services—Coding of Moving Video, Recommendation ITU-T H.265.1, Oct. 2014, 42 pages.

International Telecommunication Union, "Advanced Video Coding for Generic Audiovisual Services". Series H: Audiovisual and Multimedia Systems; Infrastructure of Audiovisual Services—Coding of Moving Video, Recommendation ITU-T H.264, Feb. 2014, 790 pages.

Husak, Walt, et. al., "Report of AHG on HDR and WCG". International Organization for Standardization, Coding of Moving Pictures and Audio, ISO/IEC JTC1/SC29/WG11, M34603, Oct. 2014, 5 pages.

International Telecommunication Union, "Parameters Values for Ultra-High Definition Television Systems For Production and International Programme Exchange". BT Series Broadcasting Service, Recommendation, Recommendation ITU-R BT.2020-1, Jun. 2014, 8 pages.

International Telecommunication Union, "High Efficiency Video Coding". Series H: Audiovisual and Multimedia Systems; Infrastructure of Audiovisual Services—Coding of Moving Video, Recommendation ITU-T H.265, Telecommunication Standardization Sector of ITU, Oct. 2014, 540 pages.

Le Leannec, Fabrice Le et al., "Usage of Modulation Channel for High Bit-Depth and Floating Point Signal Encoding". Joint Collaborative Team on Video Coding (JCT-VC) of ITU-T SG 16 WP 3 and ISO/IEC JTC 1/SC 29/WG 11 18th Meeting, JCTVC-R0267, Jun. 30-Jul. 9, 2014, pp. 1-12.

Andrivon, P., et. al., "AVC Update with Colour Remapping Information SEI Message". Motion Picture Expert Group (MPEG) Meeting, M35665, Feb. 6-20, 2015.

Le Leannec, Fabrice Le et al., "Usage of Modulation Channel for High Bit-Depth and Floating Point Signal Encoding". Joint Collaborative Team on Video Coding (JCT-VC) of ITU-T SG 16 WP 3 and ISO/IEC JTC 1/SC 29/WG 11 18th Meeting, JCTVC-R0267r1, Jun. 30-Jul. 9, 2014, pp. 1-12.

Tsai, Chi-Yi, "A Fast Dynamic Range Compression with Local Contrast Preservation Algorithm and Its Application to Real-Time

(56) References Cited

OTHER PUBLICATIONS

Video Enhancement". IEEE Transactions on Multimedia, vol. 14, No. 4, Aug. 2012, pp. 1140-1152.
International Search Report and Written Opinion of the International Searching Authority for PCT/EP2016/064839 dated Dec. 13, 2016, 10 pages.
International Preliminary Report on Patentability for PCT/EP2016/064839 dated Jan. 2, 2018, 7 pages.
Andrivon, Pierre et. al., "SEI message for Colour Mapping Information". Joint Collaborative Team on Video Coding (JCT-VC) of ITU-T SG 16 WP 3 and ISO/IEC JTC 1/SC 29/WG 11 17th Meeting, JCTVC-Q0074-r3, Mar. 27-Apr. 4, 2014, pp. 1-14.
International Telecommunication Union, "Parameter Values for Ultra-High Definition Television Systems or Production and International Programme Exchange". BT Series, Broadcasting Service (Television), Recommendation ITU-R BT.2020-1, Jun. 2014, 8 pages.
SMPTE Standard, "High Dynamic Range Electro-Optical Transfer Function of Mastering Reference Displays". Society for Motion Picture and Television Engineers (SMPTE), Aug. 16, 2014, pp. 1-14.
Wang, Tsun-Hsien, et. al., "Design and Implementation of a Real-Time Global Tone Mapping Processor for High Dynamic Range Video". IEEE International Conference on Image Processing, (2007), pp. VI-209-VI-212.
Lasserre, Sebastien, et. al., "Modulation-Based HDR Video Coding with SDR Backward Compatibility". Joint Collaborative Team on Video Coding (JCT-VC) of ITU-T SG 16 WP 3 and ISO/IEC JTC 1/SC 29/WG 11 21st Meeting, Jun. 19-26, 2015, JCTVC-U0085, pp. 1-15.
International Telecommunication Union, "Parameter Values for Ultra-High Definition Television Systems for Production And International Programme Exchange." BT Series Broadcasting Service, Recommendation ITU-R BT.2020-1, Jun. 2014, 8 pages.
International Telecommunication Union, "Parameter Values for The HDTV Standards for Production and International Programme Exchange". BT Series Broadcasting Service, Recommendation ITU-R BT.709-5, Apr. 2002, 32 pages.
International Telecommunication Union, "High Efficiency Video Coding". Series H: Audiovisual and Multimedia Systems; Infrastructure of Audiovisual Services—Coding of Moving Video, Recommendation ITU-T H.265, Telecommunication Standardization Sector of ITU, Apr. 2013, 317 pages.
Iwahashi, Masahiro, et al., "Efficient Lossless Bit Depth Scalable Coding for HDR Images". Proceedings of the 2012 Asia Pacific Signal and Information Processing Association Annual Summit and Conference, (2012), pp. 1-4.
Mantiuk, Rafał, et al., "Backward Compatible High Dynamic Range MPEG Video Compression." ACM Transactions on Graphics, SIGGRAPH Papers, (2006), pp. 713-723.
Pascale, Danny, "A Review of RGB Color Spaces, from xyY to R'G'B". Babel Color, Oct. 6, 2003, 35 pages.
SMPTE Standard, "High Dynamic Range Electro-Optical Transfer Function of Mastering Reference Displays". The Society of Motion Picture and Television Engineers (SMPTE) Standard, SMPTE Standard 2084:2014, approved Aug. 16, 2014, pp. 1-14.
Kwon, Hyuk-Ju, et al., "Compensation of De-Saturation Effect in HDR Imaging Using A Real Scene Adaptation Model" Journal of Visual Communication and Image Representation, vol. 24, (2013), pp. 678-685.
Chae, Seok-Min, et al. "A Tone Compression Model for The Compensation of White Point Shift Generated from HDR Rendering." IEICE Transactions on Fundamentals of Electronics, Communications and Computer Sciences, vol. E95-A, No. 8, Aug. 2012, pp. 1297-1301.

\* cited by examiner

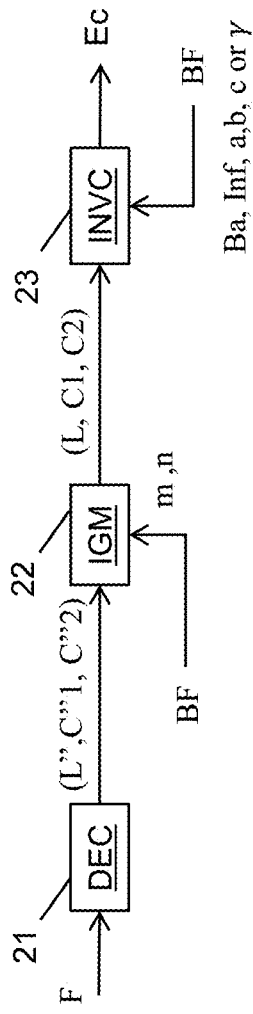
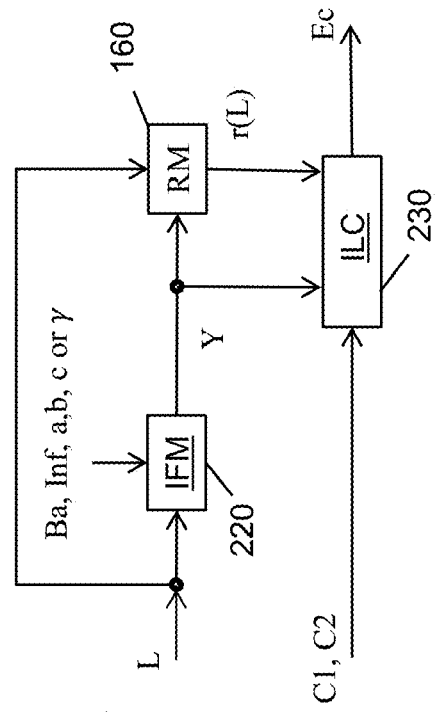
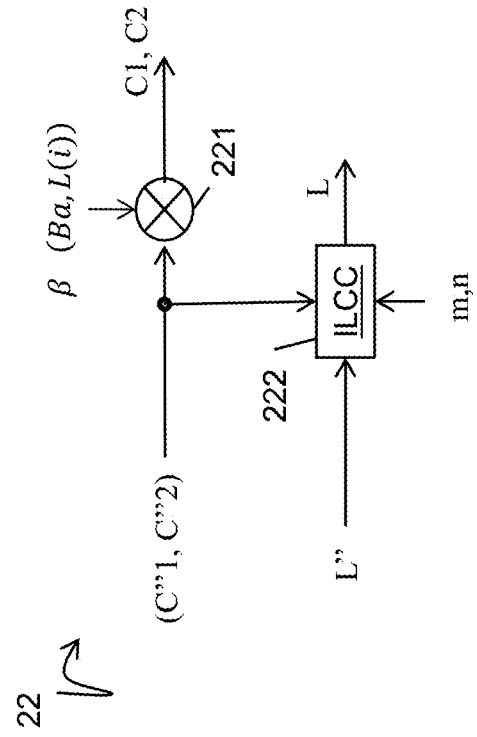
Fig. 8
Fig. 9
Fig. 10

METHOD AND APPARATUS OF ENCODING AND DECODING A COLOR PICTURE

CROSS REFERENCE TO RELATED APPLICATIONS

This application is a continuation under 35 U.S.C. § 120 of co-pending U.S. patent application Ser. No. 15/547,512 dated Jul. 30, 2017, which is a 35 U.S. C. § 371 national stage application of PCT/EP16/051449, filed on Jan. 25, 2016, and published in accordance with PCT Article 21 (2) on Jan. 4, 2018 in English, and claiming the benefit of EP applications 15306607.1 and 15305125.5, filed Oct. 9, 2015 and Jan. 30, 2015, respectively.

1. FIELD

The present disclosure generally relates to picture/video encoding and decoding. Particularly, but not exclusively, the technical field of the present disclosure is related to encoding/decoding of a picture whose pixels values belong to a high-dynamic range.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the following, a color picture contains several arrays of samples (pixel values) in a specific picture/video format which specifies all information relative to the pixel values of a picture (or a video) and all information which may be used by a display and/or any other device to visualize and/or decode a picture (or video) for example. A color picture comprises at least one component, in the shape of a first array of samples, usually a luma (or luminance) component, and at least one another component, in the shape of at least one other array of samples. Or, equivalently, the same information may also be represented by a set of arrays of color samples (color component), such as the traditional tri-chromatic RGB representation.

A pixel value is represented by a vector of C values, where c is the number of components. Each value of a vector is represented with a number of bits which defines a maximal dynamic range of the pixel values.

Standard-Dynamic-Range pictures (SDR pictures) are color pictures whose luminance values are represented with a limited dynamic usually measured in power of two or f-stops. SDR pictures have a dynamic around 10 fstops, i.e. a ratio 1000 between the brightest pixels and the darkest pixels in the linear domain, and are coded with a limited number of bits (most often 8 or 10 in HDTV (High Definition Television systems) and UHDTV (Ultra-High Definition Television systems) in a non-linear domain, for instance by using the ITU-R BT.709 OEFT (Optico-Electrical-Transfer-Function) (*Rec. ITU-R BT.*709-5, April 2002) or ITU-R BT.2020 OETF (*Rec. ITU-R BT.*2020-1, June 2014) to reduce the dynamic. This limited non-linear representation does not allow correct rendering of small signal variations, in particular in dark and bright luminance ranges. In High-Dynamic-Range pictures (HDR pictures), the signal dynamic is much higher (up to 20 f-stops, a ratio one million between the brightest pixels and the darkest pixels) and a new non-linear representation is needed in order to maintain a high accuracy of the signal over its entire range. In HDR pictures, raw data are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A color gamut is a certain complete set of colors. The most common usage refers to a set of colors which can be accurately represented in a given circumstance, such as within a given color space or by a certain output device.

A color gamut is sometimes defined by RGB primaries provided in the CIE1931 color space chromaticity diagram and a white point as illustrated in FIG. 1.

It is common to define primaries in the so-called CIE1931 color space chromaticity diagram. This is a two dimensional diagram (x,y) defining the colors independently on the luminance component. Any color XYZ is then projected in this diagram thanks to the transform:

$$\begin{cases} x = \dfrac{X}{X+Y+Z} \\ y = \dfrac{Y}{X+Y+Z} \end{cases}$$

The z=1-x-y component is also defined but carry no extra information.

A gamut is defined in this diagram by the triangle whose vertices are the set of (x,y) coordinates of the three primaries RGB. The white point W is another given (x,y) point belonging to the triangle, usually close to the triangle center.

A color volume is defined by a color space and a dynamic range of the values represented in said color space.

For example, a color gamut is defined by a RGB ITU-R Recommendation BT.2020 color space for UHDTV. An older standard, ITU-R Recommendation BT.709, defines a smaller color gamut for HDTV. In SDR, the dynamic range is defined officially up to 100 nits (candela per square meter) for the color volume in which data are coded, although some display technologies may show brighter pixels.

As explained extensively in "*A Review of RGB Color Spaces*" by Danny Pascale, a change of gamut, i.e. a transform that maps the three primaries and the white point from a gamut to another, can be performed by using a 3×3 matrix in linear RGB color space. Also, a change of space from XYZ to RGB is performed by a 3×3 matrix. As a consequence, whatever RGB or XYZ are the color spaces, a change of gamut can be performed by a 3×3 matrix. For example, a gamut change from BT.2020 linear RGB to BT.709 XYZ can be performed by a 3×3 matrix.

High Dynamic Range pictures (HDR pictures) are color pictures whose luminance values are represented with a HDR dynamic that is higher than the dynamic of a SDR picture.

The HDR dynamic is not yet defined by a standard but one may expect a dynamic range up to a few thousands nits. For instance, a HDR color volume is defined by a RGB BT.2020 color space and the values represented in said RGB color space belong to a dynamic range from 0 to 4000 nits. Another example of HDR color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamut) or versions of the picture whose at least one of their colors has been altered/enhanced according to different color grades. This may involve user interactions.

For example, in cinematographic production, a picture and a video are captured using tri-chromatic cameras into RGB color values composed of 3 components (Red, Green and Blue). The RGB color values depend on the tri-chromatic characteristics (color primaries) of the sensor. A first color-graded version of the captured picture is then obtained in order to get theatrical renders (using a specific theatrical grade). Typically, the values of the first color-graded version of the captured picture are represented according to a standardized YUV format such as BT.2020 which defines parameter values for UHDTV.

The YUV format is typically performed by applying a non-linear function, so called Optical Electronic Transfer Function (OETF) on the linear RGB components to obtain non-linear components R'G'B', and then applying a color transform (usually a 3×3 matrix) on the obtained non-linear R'G'B' components to obtain the three components YUV. The first component Y is a luminance component and the two components U,V are chrominance components.

Then, a Colorist, usually in conjunction with a Director of Photography, performs a control on the color values of the first color-graded version of the captured picture by fine-tuning/tweaking some color values in order to instill an artistic intent.

The problem to be solved is the distribution of a compressed HDR picture (or video) while, at the same time, distributing an associated SDR picture (or video) representative of a color-graded version of said HDR picture (or video).

A trivial solution is simulcasting both SDR and HDR picture (or video) on a distribution infrastructure but the drawback is to virtually double the needed bandwidth compared to a legacy infrastructure distributing adapted to broadcast SDR picture (or video) such as HEVC main 10 profile ("*High Efficiency Video Coding*", *SERIES H: AUDIOVISUAL AND MULTIMEDIA SYSTEMS, Recommendation ITU-T H.265, Telecommunication Standardization Sector of ITU*, April 2013).

Using a legacy distribution infrastructure is a requirement to accelerate the emergence of the distribution of HDR pictures (or video). Also, the bitrate shall be minimized while ensuring good quality of both SDR and HDR version of the picture (or video).

Moreover, backward compatibility may be ensured, i.e. the SDR picture (or video) shall be viewable for users equipped with legacy decoder and display, i.e. in particular, overall perceived brightness (i.e. dark vs. bright scenes) and perceived colors (for instance, preservation of hues, etc.) should be preserved.

Another straightforward solution is to reduce the dynamic range of the HDR picture (or video) by a suitable non-linear function, typically into a limited number of bits (say 10 bits), and directly compressed by the HEVC main10 profile. Such non-linear function (curve) already exist like the so-called PQ EOTF proposed by Dolby at SMPTE (*SMPTE standard: High Dynamic Range Electro-Optical Transfer Function of Mastering Reference Displays, SMPTE ST* 2084:2014).

The drawback of this solution is the lack of backward compatibility, i.e. the obtained reduced version of the picture (video) has not a sufficient visual quality to be considered as being viewable as a SDR picture (or video), and compression performance are somewhat poor.

The present disclosure has been devised with the foregoing in mind.

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method and device as claimed.

It may appear that the colors obtained by combining together a luminance component and two chrominance components representing a SDR version of a HDR color picture do not preserve hue and perceived saturation of the colors of the HDR color picture.

Mapping the gamut of colors of such SDR picture onto the gamut of the colors of the HDR color picture to be encoded correct the hue and perceived saturation relatively to said HDR picture.

The hue and perceived saturation of the color of the HDR picture are thus preserved increasing the visual quality of the decoded SDR picture whose perceived colors match the original HDR better.

According to an embodiment, mapping the luminance and chrominance components onto a final luminance component and two final chrominance components comprises:
  scaling each of the two chrominance components by a first factor that depends on a modulation value obtained from the luminance component and the value of each pixel of the luminance component; and
  obtaining the final luminance component by linearly combining together the luminance component and the two final chrominance components.

This embodiment allows getting a SDR color picture by combining together the decoded luminance and chrominance components. This SDR color picture may be displayed by a legacy SDR display. In other terms, such a SDR color picture is viewable by an end-user from his legacy SDR display. The method allows thus backward compatibility with any SDR legacy display. Moreover, a HDR picture may be formed from final luminance and chrominance components obtained by mapping the luminance and chrominance components (SDR color picture) onto said final luminance and chrominance components avoiding thus simulcasting both the SDR and HDR pictures.

According to an embodiment, obtaining said two chrominance components from said at least one intermediate color component comprises:
  obtaining three intermediate components by taking the square-root of each intermediate color component; and
  linearly combining together the three intermediate components.

The square root function is used to approximate an OEFT (Optico-Electrical-Transfer-Function) required at the encoding side. Such an approximation leads non-ambiguous invertible formulas and to a low complexity decoder partly because the EOTF (Electro-Optical-Transfer-Function), that shall be applied at the decoder side to decode the full dynamic input picture, is then a square function.

Also, the SDR picture shows somewhat consistent colors because the square root is a good approximation of the standard SDR OETF defined by the ITU-R Recommendation BT.709/BT.2020, used in HD/UHD TV, which is mainly a power 0.45.

According to another of its aspects, the present disclosure relates to a method of decoding a color picture from a bitstream.

According to other of its aspects, the disclosure relates to devices comprising a processor configured to implement the above methods, a computer program product comprising program code instructions to execute the steps of the above methods when this program is executed on a computer, a processor readable medium having stored therein instructions for causing a processor to perform at least the steps of the above methods, and a non-transitory storage medium carrying instructions of program code for executing steps of the above methods when said program is executed on a computing device.

The specific nature of the disclosure as well as other objects, advantages, features and uses of the disclosure will become evident from the following description of embodiments taken in conjunction with the accompanying drawings.

4. BRIEF DESCRIPTION OF DRAWINGS

In the drawings, an embodiment of the present disclosure is illustrated. It shows:

FIG. 8 shows schematically a diagram of the steps of a method of decoding a color picture from at least one bitstream in accordance with an embodiment of the disclosure;

FIG. 9 shows schematically a diagram of the sub-steps of the step 22 in accordance with an embodiment of the disclosure;

FIG. 10 shows schematically a diagram of the sub-steps of the step 23 in accordance with an embodiment of the disclosure;

Figure 11A:
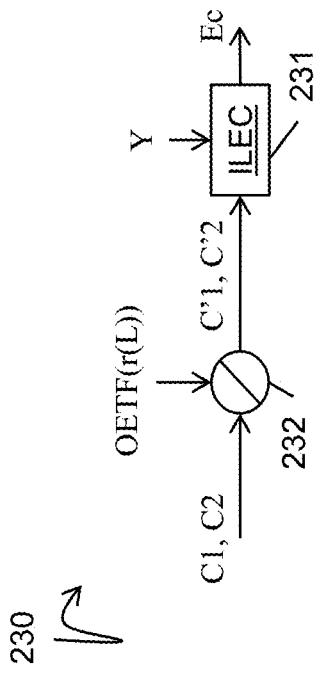
Figure 11B:
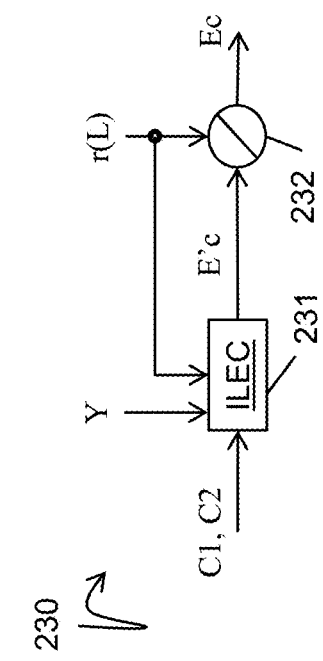
Figure 12:
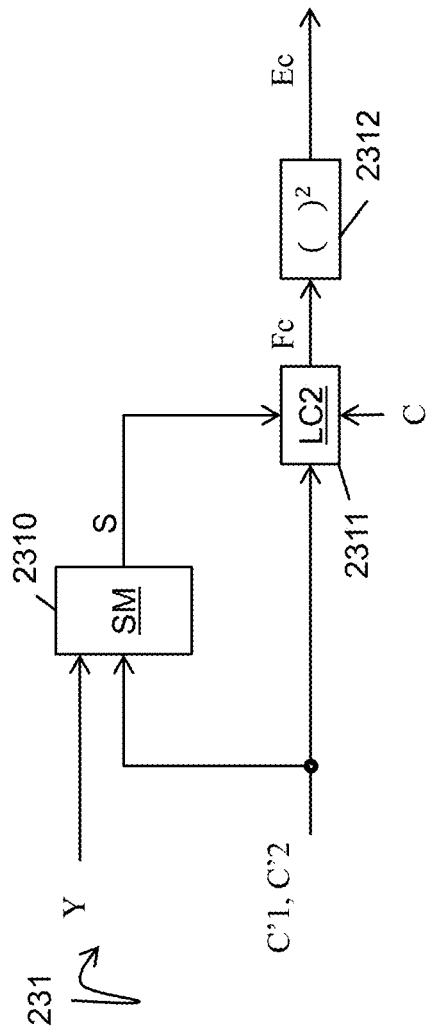
Figure 14:
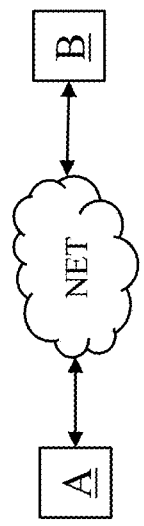
Figure 15:
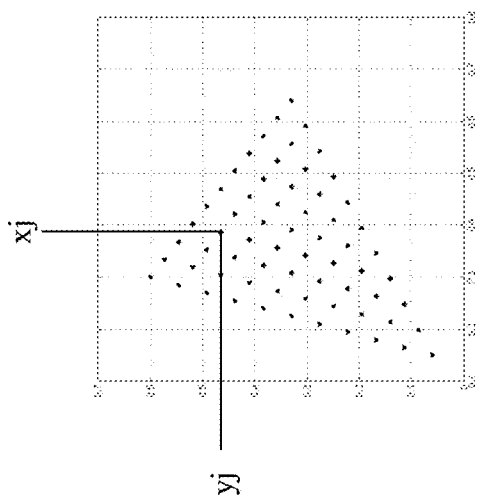
Figure 13:
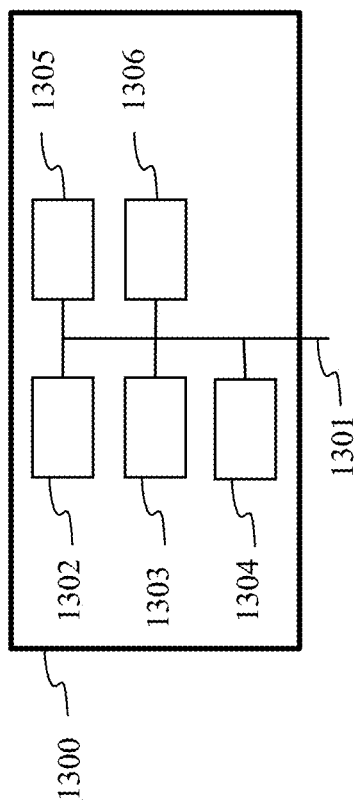

FIG. 11a-b shows schematically a diagram of the sub-steps of the step 230 in accordance with different embodiments of the disclosure;

FIG. 12 shows schematically a diagram of the sub-steps of the step 231 in accordance with an embodiment of the disclosure;

FIG. 13 shows an example of an architecture of a device in accordance with an embodiment of the disclosure;

FIG. 14 shows two remote devices communicating over a communication network in accordance with an embodiment of the disclosure; and FIG. 15 illustrates an example of set of elements in the CEI 1931 diagram of a gamut.

Similar or same elements are referenced with the same reference numbers.

6. DESCRIPTION OF EMBODIMENTS

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

In an embodiment, a factor (i.e a real value) depends on a modulation value Ba. A modulation (or backlight) value is usually associated with an HDR picture and is representative of the brightness of the HDR picture. Here, the term (modulation) backlight is used by analogy with TV sets made of a color panel, like a LCD panel for instance, and a rear illumination apparatus, like a LED array for instance. The rear apparatus, usually generating white light, is used to illuminate the color panel to provide more brightness to the TV. As a consequence, the luminance of the TV is the product of the luminance of rear illuminator and of the luminance of the color panel. This rear illuminator is often called "modulation" or "backlight" and its intensity is somewhat representative of the brightness of the overall scene.

The disclosure is described for encoding/decoding a color picture but extends to the encoding/decoding of a sequence of pictures (video) because each color picture of the sequence is sequentially encoded/decoded as described below.

In the following, the color picture I is considered as having three color components Ec (c=1, 2 or 3) in which the pixel values of the color picture I are represented.

The present disclosure is not limited to any color space in which the three components Ec are represented but extends to any color space such as RGB, CIELUV, XYZ, CIELab, etc.

Figure 2:
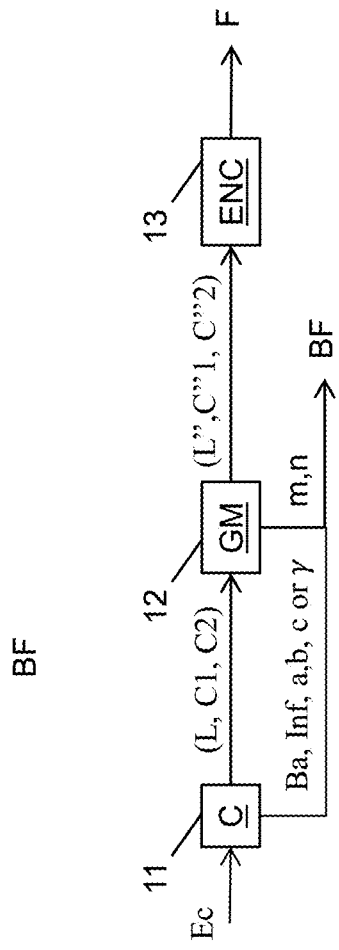
FIG. 2 shows schematically a diagram of the steps of a method of encoding a color picture in accordance with an embodiment of the disclosure.

FIG. 2 shows schematically a diagram of the steps of a method of encoding a color picture I in accordance with an embodiment of the disclosure.

In step 11, a module C obtains a luminance component L and two chrominance components C1 and C2 from a color picture I to be encoded. For instance the components (L, C1, C2) may belong to the YUV color space, obtained after applying an OETF on the color picture I, and the color components Ec may belong either to a linear RGB or XYZ color space.

In step 12, a module GM maps the luminance L and chrominance C1, C2 components onto a final luminance component L" and two final chrominance components C"1, C"2 in order that the gamut G2 of colors obtained from said final luminance (L") and chrominance (C"1, C"2) components maps onto the gamut G1 of the colors of the color picture I to be encoded.

Figure 3:
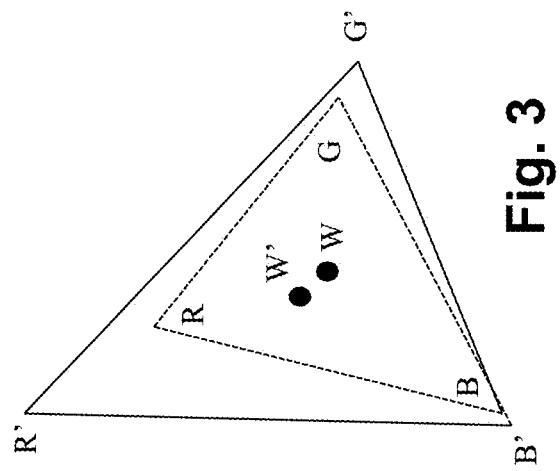
FIG. 3 illustrates the principle of a gamut mapping in accordance with the present disclosure.

FIG. 3 illustrates such a gamut mapping. In dashed line is represented the gamut (R,G,B,W) of the colors obtained from the component L and the two chrominance components C1 and C2 and in solid line the gamut (R', G', B', W) of the colors of the picture I to be encoded.

Mapping the gamut (R, G, B, W) onto the gamut (R', G', B', W) means mapping the primaries R, G, B to the primaries R', G', B' respectively and mapping the white point W to the white point W. The purpose of the mapping is to transform (L, C1, C2) into (L", C"1, C"2) such that the perceived colors obtained from the L", C"1, C"2 components match the colors of the color picture I better than (L, C1, C2) do.

In step 13, an encoder ENC encodes the final luminance L" component and the two final chrominance components C"1, C"2.

According to an embodiment, the encoded component L" and chrominance components C"1, C"2 are stored in a local or remote memory and/or added into a bitstream F.

Figure 4:
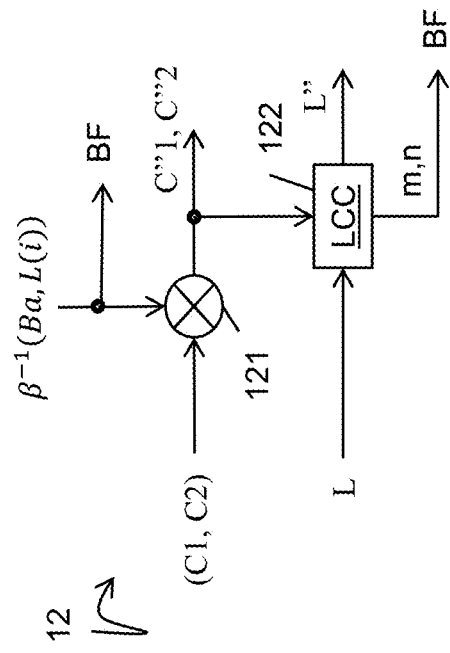
FIG. 4 shows schematically a diagram of the sub-steps of the step 12 in accordance with an embodiment of the disclosure.
Figure 1:
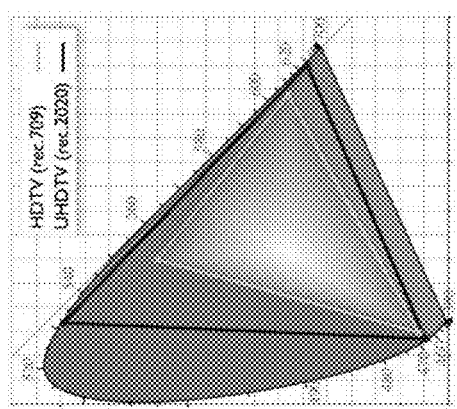
FIG. 1 shows examples of chromaticity diagrams.

According to an embodiment of the step 12, illustrated in FIG. 4, the two final chrominance components C"1, C"2 are obtained by scaling (step 121) each of the two chrominance components C1, C2 by a factor $\beta^{-1}(L(i))$ that depends on the value of each pixel i of the luminance component L, and a module LCC (step 122) obtains the final luminance component L" by linearly combining together the luminance component L and the two final chrominance components C"1, C"2:

$$\begin{cases} L'' = L - mC_1'' - nC_2'' \\ C_1'' = \beta^{-1}(L(i)) * C_1 \\ C_2'' = \beta^{-1}(L(i)) * C_2 \end{cases} \quad (A)$$

where m and n are coefficients (real values) that avoid color saturation by correcting the highest luminance peaks.

According to a variant, the factor $\beta^{-1}(L(i))$ further depends on a modulation value Ba.

According to an embodiment, the coefficients m and n are stored in either a local or remote memory and/or added to a bitstream BF as illustrated in FIG. 4.

According to a variant of the module LCC (of equation A), the values of the final luminance component L" are always lower than the values of the luminance component L:

$L''=L-\max(0,mC''_1+nC''_2)$

This ensures that the values of the final luminance component L" do not exceed the values of the luminance component L and thus ensures that no color saturation occurs.

According to an embodiment, the factor $\beta^{-1}(L(i))$ is obtained from a Look-Up-Table (LUT) for a specific luminance value L(i), and optionally further for a specific modulation value Ba and. Thus, for multiple luminance peak values such as for example, 1000, 1500 and 4000 nits, a specific factor $\beta^{-1}(L(i))$ is stored in a LUT for each specific modulation value Ba.

According to a variant, the factor $\beta^{-1}(L(i))$ is obtained for a value of a pixel of the luminance component L by interpolating the luminance peaks between the multiple luminance peaks for which LUT are stored.

According to a variant, the factor $\beta^{-1}(L(i))$ for a specific modulation value Ba is obtained for a value of a pixel of the luminance component L by interpolating the luminance peaks between the multiple luminance peaks for which LUT are stored.

According to an embodiment, the factor $\beta^{-1}(L(i))$ and the coefficients m and n in equation (A) are obtained as follows.

Mapping the gamut G2 of the colors obtained from the final luminance (L") and chrominance (C"1, C"2) components onto the gamut G1 of the colors of the color picture I (obtained from the components L, C1 and C2) is given by:

$$\begin{bmatrix} L'' \\ C_1'' \\ C_2'' \end{bmatrix} = \Phi_{Ba}(Y) \begin{bmatrix} L \\ C_1 \\ C_2 \end{bmatrix} \quad (B)$$

where $\Phi_{Ba}(Y)$ is a mapping function depending on the linear luminance Y of the color picture I. Typically, the linear luminance Y is obtained as a linear combination of the components Ec of the color picture I. The luminance component L is related unambiguously to the linear luminance Y and the backlight value Ba, such that one may write $$\Phi_{Ba}(Y) = \Phi_{Ba}(f(Ba,Y)) = \Phi_{Ba}(L)$$

and the mapping function is seen as a function of the luminance component L.

Now, let us fix a modulation value Ba and a specific linear luminance level $Y_0$. Let us suppose that the color components Ec are expressed in the linear RGB color space. The associated three primaries $R_{Y_0}, G_{Y_0}, B_{Y_0}$ of the gamut G2 are given by $$R_{Y_0} = \begin{bmatrix} Y_0/A_{11} \\ 0 \\ 0 \end{bmatrix}, G_{Y_0} = \begin{bmatrix} 0 \\ Y_0/A_{12} \\ 0 \end{bmatrix}, R_{Y_0} = \begin{bmatrix} 0 \\ 0 \\ Y_0/A_{13} \end{bmatrix} \quad (C)$$

where A1 is the one-row matrix that defines the linear luminance Y from the linear RGB, i.e.

$$Y = A_1 \begin{bmatrix} E_1 \\ E_2 \\ E_3 \end{bmatrix}.$$

Let denote S a 3×3 matrix made of the images $\mu(\cdot)$ corresponding to the application the module C (step 11), of these three primaries:

$$S_{Y_0} = [\mu(R_{Y_0}) \mu(G_{Y_0}) \mu(B_{Y_0})].$$

The purpose of the mapping function $\Phi_{Ba}(L)$ is to map back $S_{Y_0}$ onto the three primaries of the gamut G2. In other words, the matrix $S_{Y_0}$ should be under the form:

$$A \begin{bmatrix} r & 0 & 0 \\ 0 & g & 0 \\ 0 & 0 & b \end{bmatrix}$$

where r,g,b are unknown parameters and A is the 3×3 matrix that transforms the non-linear color space R'G'B' into the color space of LC1C2. All put together, one gets:

$$\Phi_{Ba}(L) S_{Y_0} = A \begin{bmatrix} r & 0 & 0 \\ 0 & g & 0 \\ 0 & 0 & b \end{bmatrix} = AD$$

Also, the preservation of the white point, whose coordinates are [1 0 0] in the color space of LC1C2, leads to another condition:

$$\begin{bmatrix} \eta \\ 0 \\ 0 \end{bmatrix} = \Phi_{Ba}(L) \begin{bmatrix} 1 \\ 0 \\ 0 \end{bmatrix} = ADS_{Y_0}^{-1} \begin{bmatrix} 1 \\ 0 \\ 0 \end{bmatrix}$$

where $\eta$ is another unknown parameter. As a consequence, the matrix D is uniquely determined by:

$$\mathrm{diag}(D) = \eta A^{-1} \begin{bmatrix} 1 \\ 0 \\ 0 \end{bmatrix} \Big/ S_{Y_0}^{-1} \begin{bmatrix} 1 \\ 0 \\ 0 \end{bmatrix} \quad (D)$$

where the division is understood as the coefficient division of the first column of $A^{-1}$ by the first column of $S_{Y_0}^{-1}$. As a consequence, the mapping matrix is determined up to a scaling factor $\eta$.

The inverse of the mapping function $\Phi_{Ba}(L)$, required at the decoding side, is not easily obtained because it requires solving an implicit non-linear problem in L, because one gets easily the inverse matrix $\Phi_{Ba}^{-1}(L)$ as a function of the luminance component L, but not its counter part $\Phi_{Ba}^{-1}(L'')$ as a function of final luminance component L''. We show that the formulation of $\Phi_{Ba}(L)$ can be further simplified in order to obtain a simple inverse $\Phi_{Ba}^{-1}(L'')$.

Actually, the mapping function may be expressed by:

$$\Phi_{Ba}(L) = \begin{bmatrix} \eta & -m\beta^{-1}(Ba, L(i)) & -n\beta^{-1}(Ba, L(i)) \\ 0 & \beta^{-1}(Ba, L(i)) & 0 \\ 0 & 0 & \beta^{-1}(Ba, L(i)) \end{bmatrix} \quad (E)$$

where m and n are coefficients (real values) that depend on the luminance level $Y_0$. The inverse $\Phi_{Ba}^{-1}(L)$ of the mapping function $\Phi_{Ba}(L)$ is given by:

$$\Phi_{Ba}^{-1}(L) = SD^{-1}A^{-1} \quad (F)$$

with its first column given by $$\Phi_{Ba}^{-1}(L)_{col1} = \eta^{-1} \begin{bmatrix} 1 \\ 0 \\ 0 \end{bmatrix}$$

Following some algebraic manipulations, one shows that equation (F) becomes $$\Phi_{Ba}^{-1}(L) = \eta^{-1} \begin{bmatrix} 1 & m & n \\ 0 & \beta & 0 \\ 0 & 0 & \beta \end{bmatrix},$$

leading to the mapping function $$\Phi_{Ba}(L) = \Phi_0 \begin{bmatrix} \eta & 0 & 0 \\ 0 & \eta\beta^{-1} & 0 \\ 0 & 0 & \eta\beta^{-1} \end{bmatrix} \quad (G)$$

where m and n are real values (coefficients) that do not depend on the modulation value Ba and the luminance component L, $\beta=\beta(Ba,L(i))$ and one has defined the fixed matrix $$\Phi_0 = \begin{bmatrix} 1 & m & n \\ 0 & 1 & 0 \\ 0 & 0 & 1 \end{bmatrix}$$

Equations (B) and (G) show that the mapping function has two effects: first, the dynamic of the luminance component L is scaled by a scaling factor $\eta$ and, second, the chrominance components C1 and C2 are also scaled by a scaling factor $\eta\beta^{-1}$.

In order to preserve the global luminance mapping between L and L", the parameter $\eta$ is set to one. Equation (G) becomes:

$$\Phi_{Ba}(L) = \Phi_0 \begin{bmatrix} 1 & 0 & 0 \\ 0 & \beta^{-1}(Ba, L(i)) & 0 \\ 0 & 0 & \beta^{-1}(Ba, L(i)) \end{bmatrix} \quad (H)$$

where $\beta$ does depend on the modulation value Ba and the luminance component. This formula is inverted to get the inverse mapping function $$\Phi_{Ba}^{-1}(L'') = \begin{bmatrix} 1 & 0 & 0 \\ 0 & \beta(Ba, L(i)) & 0 \\ 0 & 0 & \beta(Ba, L(i)) \end{bmatrix} \Phi_0^{-1} \quad (I)$$

Here, the luminance component L is obtained back from L", C"1, C"2 by applying the matrix $\Phi_0^{-1}$ and then, since L is known, one finds the factor) $\beta(Ba,L(i))$ to apply to the final chrominance components C"1, C"2 to get the chrominance components C1, C2 back.

The mapping function $\Phi_{Ba}(L)$ is then provided by equation (H) where the constant matrix t is used for all luminance level up to the luminance peak P of the color image I, and $\beta$ defined on the full range of luminance up to the luminance peak P.

Including equation (H) in equation (B) leads to equation (A).

According to another embodiment, the factor $\beta^{-1}(Ba,L(i),m,n)$ is considered as depending also on the coefficients m and n which are given as explained in the previous embodiment.

The factor $\beta^{-1}$ is thus the single unknown value in step 12.

The factor $\beta^{-1}$ is obtained such that a gamut distortion calculated between the gamuts G1 and G2 is minimized. In other words, the factor $\beta^{-1}$ is the optimal factor under the condition of gamut preservation.

Mathematically speaking, the factor $\beta^{-1}$ is obtained by:

$$\beta^{-1}(Ba_0,L_0,m,n) = \operatorname{argmin}_{\beta_{test}^{-1}} GD(\beta_{test}^{-1}),$$

where $Y_0$ is a given luminance value from which is deduced a luminance value $L_0$, $Ba_0$ is a given modulation value given and the gamut distortion $GD(\beta_{test}^{-1})$ is given by:

$$GD(\beta_{test}^{-1}) = \sum_j (x_j - x'_j)^2 + (y_j - y'_j)^2$$

in which the gamut distorsion is defined by the sum of the square error between an element $(x_j,y_j)$ of the gamut G1 and an associated element $(x'_j,y'_j)$ of the gamut G2.

Let us fix a luminance value Y0. One obtains the corresponding XYZ values of each element of the set by $$X_j = Y_0 x_j/y_j, Y_j = Y_0 \text{ and } Z_j = Y_0(1-x_j-y_j)/y_j.$$

and then the corresponding color values Ecj (c=1,2, or 3). Let us fix and impose a modulation value Ba0 and a test factor $\beta_{test}^{-1}$ used for $\beta^{-1}(Ba_0,L_0,m,n)$ at step 121.

One obtains the final values L"j, C"1j and C"2j by applying the coding chain, made of steps 11 and 12 to the color components. From these final values, one deduces the associated gamut set of associated element $(x'j,y'j)$ in the CEI 1931 diagram.

FIG. 15 illustrates an example of set of elements $(x_j,y_j)$ in the CEI 1931 diagram of a gamut. Note the XYZ coordinates of each element $(x_j,y_j)$ are given by $$X_j = Y_0 x_j/y_j, Y_j = Y_0 \text{ and } Z_j = Y_0(1-x_j-y_j)/y_j.$$

By making the modulation value $Ba_0$ and the luminance component $L_0$ vary, and minimizing the associated gamut distortion GD(•), one gets all the factors $\beta^{-1}(Ba_0,L_0,m,n)$ depending on the modulation value $Ba_0$, the luminance component $L_0$ and for fixed coefficients m and n.

Figure 5:
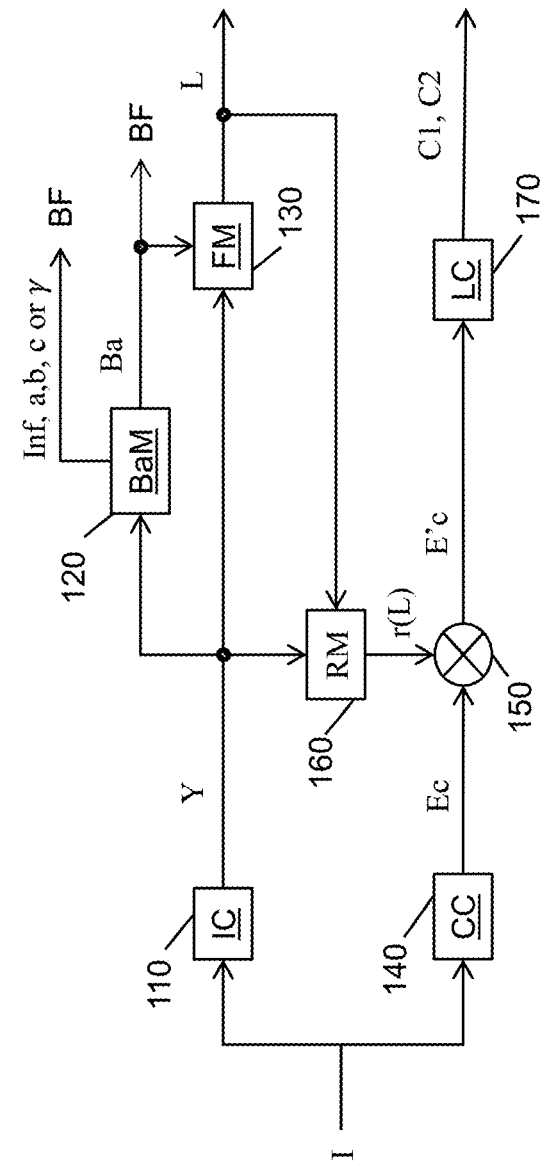
FIG. 5 shows schematically a diagram of the sub-steps of the step 11 in accordance with an embodiment of the disclosure.

According to an embodiment of the step 11, illustrated in FIG. 5, in step 110, a module IC obtains a component Y that represents the luminance of the color picture I by linearly combining together the three components Ec:

$$Y = A_1 \begin{bmatrix} E_1 \\ E_2 \\ E_3 \end{bmatrix}$$

where A1 is the first row of a 3×3 matrix A that defines a color space transforms from the (E1, E2, E3) color space to a color space (Y, C1, C2).

In step 130, a module FM obtains the luminance component L by applying a non-linear function f on the component Y:

$$L = f(Ba,Y) \quad (1)$$

where Ba is a modulation value obtained from the component Y by the module BaM (step 120).

Applying the non-linear function f on the component Y reduces its dynamic range. In other terms, the dynamic of the luminance component L is reduced compared to the dynamic of the component Y.

Basically the dynamic range of the component Y is reduced in order that the luminance values of the component L are represented by using 10 bits.

According to an embodiment, the component Y is divided by the modulation value Ba before applying the non-linear function f:

$$L = f(Y/Ba) \quad (2)$$

According to an embodiment, the non-linear function f is a gamma function:

$$L = B \cdot Y_1^\gamma$$

where $Y_1$ equals either Y or Y/Ba according to the embodiments of eq. (1) or (2), B is a constant value, $\gamma$ is a parameter (real value strictly below 1).

According to an embodiment, the non-linear function f is a S-Log function:

$$L = a \cdot \ln(Y_1 + b) + c$$

where a, b and c are parameters (real values) of a S Log curve determined such that f(0) and f(1) are invariant, and the derivative of the S Log curve is continuous in 1 when prolonged by a gamma curve below 1. Thus, a, b and c are functions of the parameter γ.

Typical values are shown in Table 1.

TABLE 1

| Y | a | B | c |
|---|---|---|---|
| 1/2.0 | 0.6275 | 0.2550 | 0.8575 |
| 1/2.4 | 0.4742 | 0.1382 | 0.9386 |
| 1/2.8 | 0.3861 | 0.0811 | 0.9699 |

In an advantageous embodiment, a value of γ close to 1/2.5 is efficient in terms of HDR compression performance as well as good viewability of the obtained SDR luma. Thus, the 3 parameters may advantageously take the following values: a=0.44955114, b=0.12123691, c=0.94855684.

According to an embodiment, the non-linearfunction f is either a gamma correction or a S Log correction according to the pixel values of the component Y.

Applying a gamma correction on the component Y, pulls up the dark regions but does not lower enough high lights to avoid burning of bright pixels.

Then, according to an embodiment, the module FM applies either the gamma correction or the S Log correction according to the pixel values of the component Y. An information data Inf may indicate whether either the gamma correction or Slog correction applies.

For example, when the pixel value of the component Y is below a threshold (equal to 1), then the gamma correction is applied and otherwise the S Log correction is applied.

According to an embodiment of the step 120, the modulation value Ba is an average, median, min or max value of the pixel values of the component Y. These operations may be performed in the linear HDR luminance domain $Y_{lin}$ or in a non-linear domain like ln(Y) or $Y^\gamma$ with γ<1.

According to an embodiment, when the method is used to encode several color pictures belonging to a sequence of pictures, a modulation value Ba is determined for each color picture, a Group of Pictures (GOP) or for a part of a color picture such as, but not limited to, a slice or a Transfer Unit as defined in HEVC.

According to an embodiment, the value Ba and/or the parameters of the non-linear function f (such as a, b, c or γ) and/or the information data Inf is (are) stored in a local or remote memory and/or added into a bitstream BF as illustrated in FIGS. 2 and 5.

In step 140, a module CC obtains at least one color component EC (c=1, 2, 3) from the color picture I. A color component Ec may be obtained directly from a local or a remote memory or by applying a color transform on the color picture I.

In step 150, an intermediate color component E'c (c=1, 2 or 3) is obtained by scaling each color component Ec by a factor r(L) that depends on the luminance component L:

$$\begin{cases} E_1'(i) = E_1(i) * r(L(i)) \\ E_2'(i) = E_2(i) * r(L(i)) \\ E_3'(i) = E_3(i) * r(L(i)) \end{cases}$$

where r(L(i)) is a factor (real value), determined by the module RM (step 160), that depends on the value of a pixel i of the component L, $E_c'$ is the value of the pixel i of the intermediate color component E'c, and $E_c(i)$ is the value of the pixel i of the color component Ec.

Scaling by a factor means multiplying by said factor or dividing by the inverse of said factor.

Scaling each color component Ec by the factor r(L) that depends on the luminance component L preserves the hue of the colors of the color picture I.

According to an embodiment of the step 160, the factor r(L) is the ratio of the luminance component L over the component Y:

$$r(L(i)) = \frac{L(i)}{Y(i)}$$

with Y(i) being the value of a pixel i of the component Y. Actually, the value Y(i) of a pixel of the component Y depends non-ambiguously on the value L(i) of a pixel of the luminance component L, such that the ratio can be written as a function of L(i) only.

This embodiment is advantageous because scaling each color component Ec by the factor r(L) that further depends on the component Y preserves the hue of the colors of the color picture I and thus improves the visual quality of the decoded color picture.

More precisely, in colorimetry and color theory, colorfulness, chroma, and saturation refer to the perceived intensity of a specific color. Colorfulness is the degree of difference between a color and gray. Chroma is the colorfulness relative to the brightness of another color that appears white under similar viewing conditions. Saturation is the colorfulness of a color relative to its own brightness.

A highly colorful stimulus is vivid and intense, while a less colorful stimulus appears more muted, closer to gray. With no colorfulness at all, a color is a "neutral" gray (a picture with no colorfulness in any of its colors is called grayscale). Any color can be described from its colorfulness (or chroma or saturation), lightness (or brightness), and hue.

The definition of the hue and saturation of the color depends on the color space used to represent said color.

For example, when a CIELUV color space is used, the saturation $s_{uv}$ is defined as the ratio between the chroma $C_{uv}^*$ over the luminance L*.

$$s_{uv} = \frac{C_{uv}^*}{L^*} = \frac{\sqrt{u^{*2} + v^{*2}}}{L^*}$$

The hue is then given by $$h_{uv} = \arctan \frac{v^*}{u^*}$$

According to another example, when a CIELAB color space is used, the saturation is defined as the ratio of the chroma over the luminance:

$$s_{ab} = \frac{C_{ab}^*}{L^*} = \frac{\sqrt{a^{*2} + b^{*2}}}{L^*}$$

The hue is then given by $$h_{ab} = \arctan\frac{b^*}{a^*}$$

These equations are a reasonable predictor of saturation and hue that are in agreement with the human perception of saturation, and demonstrate that adjusting the brightness in CIELAB (or CIELUV) color space while holding the angle a*/b* (or u*/v*) fixed does affect the hue and thus the perception of a same color. In step 150, scaling the color components Ec by a same factor preserves this angle, thus the hue.

Now let us consider that the color picture I is represented in the CIELUV color space and a picture I2 that is formed by combining together the luminance component L, whose dynamic range is reduced compared to the dynamic range of the luminance of the color picture I (step 130), and two chrominance components U (=C1) and V (=C2) of the CIELUV color space. The colors of the picture I2 are thus differently perceived by a human being because the saturation and the hue of the colors changed. The method (step 150) determines the chrominance components C1 and C2 of the picture I2 in order that the hue of the colors of the picture I2 best match the hue of the colors of the color picture I.

According to an embodiment of the step 160, the factor r(L) is given by:

$$r(L(i)) = \frac{\max\{5, L(i)\}}{2048\max\{0.01, Y(i)\}}$$

This last embodiment is advantageous because it prevents the factor from going to zero for very dark pixels, i.e. allows the ratio to be invertible regardless of the pixel value.

In step 170, the two chrominance components C1, C2 are obtained from said at least one intermediate color components E'c.

Figure 6:
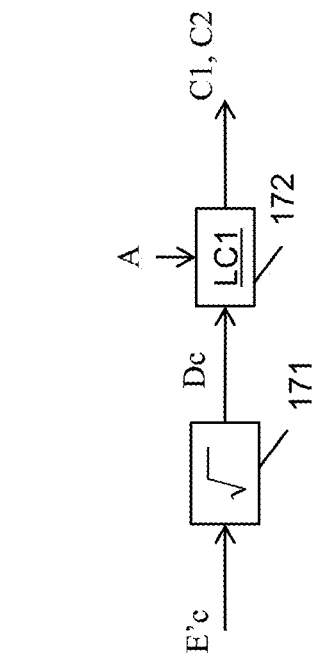
FIG. 6 shows schematically a diagram of the sub-steps of the step 170 in accordance with an embodiment of the disclosure.

According to an embodiment of the step 170, illustrated in FIG. 6, at least one intermediate component Dc (c=1, 2 or 3) is obtained by applying (step 171) an OETF on each intermediate color component (E'c):

$$\begin{cases} D_1 = OETF\ (E'_1) \\ D_2 = OETF\ (E'_2) \\ D_3 = OETF\ (E'_3) \end{cases}$$

For example, the OETF is defined by the ITU-R recommendation BT.709 or BT.2020 and stated as follows $$D_c = OETF\ (E'_c) = \begin{cases} 4.5E'_c & E'_c < 0.018 \\ 1.099E'^{0.45}_c - 0.099 & E'_c \geq 0.018 \end{cases}.$$

This embodiment allows a reduction of the dynamic range according to a specific OETF but leads to a complex decoding process as detailed later.

Figure 7:
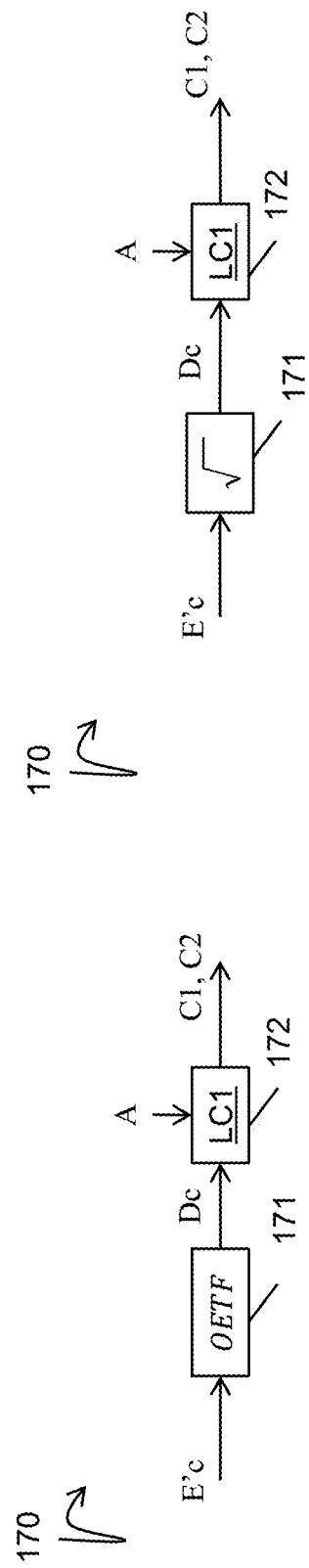
FIG. 7 shows schematically a diagram of the sub-steps of the step 170 in accordance with an embodiment of the disclosure.

According to a variant of this embodiment, illustrated in FIG. 7, the OETF is approximated by a square root, i.e. at least one intermediate component Dc (c=1, 2 or 3) is obtained by taking the square-root (step 171) of each intermediate color component (E'c):

$$\begin{cases} D_1 = \sqrt{E'_1} \\ D_2 = \sqrt{E'_2} \\ D_3 = \sqrt{E'_3} \end{cases}$$

This embodiment is advantageous because it provides a good approximation of the OETF defined by the ITU-R recommendation BT.709 or BT.2020 and leads to a low complexity decoder.

According to another variant of this embodiment, the OETF is approximated by a cubic-root, i.e. at least one intermediate component Dc (c=1, 2 or 3) is obtained by taking the cubic-root (step 171) of each intermediate color component (E'c):

$$\begin{cases} D_1 = \sqrt[3]{E'_1} \\ D_2 = \sqrt[3]{E'_2} \\ D_3 = \sqrt[3]{E'_3} \end{cases},$$

This embodiment is advantageous because it provides a good approximation of the OETF defined by the ITU-R recommendation BT.709 or BT.2020 but it leads to a somewhat more complex decoder than the decoder obtains when the OETF is approximated by a square-root.

In step 172, a module LC1 obtains the two chrominance components C1 and C2 by linearly combining the three intermediate components Dc:

$$\begin{bmatrix} C_1 \\ C_2 \end{bmatrix} = \begin{bmatrix} A_2 \\ A_3 \end{bmatrix} \begin{bmatrix} D_1 \\ D_2 \\ D_3 \end{bmatrix}$$

where A2 and A3 are the second and third rows of the 3×3 matrix A.

FIG. 8 shows schematically a diagram of the steps of a method of decoding a color picture from at least a bitstream in accordance with an embodiment of the disclosure.

In step 21, a decoder DEC obtains a luminance component L" and two chrominance components C"1, C"2 either from a local or remote memory or by decoding at least partially a bitstream F.

In step 22, a module IGM obtains a final luminance component L and two final chrominance components C1, C2 from said luminance L" and chrominance C"1, C"2 components by applying an inverse mapping on the colors obtained from said luminance L" and chrominance C"1, C"2 components.

In step 23, a module INVC obtains at least one color component Ec of the color picture to be decoded from said final luminance L component and said two final chrominance C1, C2 components. The decoded picture being obtained by combining together said at least one color component Ec.

According to an embodiment of the step 22, illustrated in FIG. 9, a module ILCC obtains (step 222) the final luminance component L by linearly combining together the luminance component L" and the two chrominance components C"1, C"2, and the two final chrominance components C1, C2 are obtained by scaling (step 221) each of the two chrominance components C"1, C"2 by a factor β (L(i)) that depends on the value of each pixel i of the final luminance component L, and:

$$\begin{cases} L = L'' + mC_1'' + nC_2'' \\ C_1 = \beta(L(i)) * C_1'' \\ C_2 = \beta(L(i)) * C_2'' \end{cases} \quad (J)$$

where m and n are coefficient (real values). The coefficients m and n may be those obtained by the factorization of the matrix $\Phi_{Ba}(L)$ in equation (G), i.e. m and n are those obtained in $\Phi_0$. Consequently, they depend on the gamut of the color picture I (for instance BT.709 or BT.2020 gamut). Typical values for m and n are m≈n in the interval [0.1,0.5]

According to a variant, the factor further depends on a modulation value Ba.

Equation (J) is considered as being an inverse mapping applies on the colors obtained from the luminance L" and chrominance C"1, C"2 components. Equation (J) is directly obtained from equation (A) that is considered as being a color mapping.

According to a variant of the module ILCC, the values of the final luminance component L are always higher than the values of the luminance component L":

$$L = L'' + \max(0, mC_1'' + nC_2'')$$

This embodiment is advantageous because it ensures that the final luminance component L does not exceed a potential clipping value that is usually used by the decoder to define a luminance peak. When a luminance peak is required by a decoder and when the final luminance component L is given by equation (J), the final luminance component L is clipped introducing some artefacts.

According to an embodiment, the modulation value Ba and/or the coefficients m and n are obtained from a remote or local memory such a Look-Up-Table, or from a bitstream BF as illustrated in FIG. 9.

According to an embodiment, the factor $\beta^{-1}(L(i))$ is obtained from a Look-Up-Table (LUT) for a specific value L(i) of the final luminance component L and, optionally further from a specific modulation value Ba and. Thus, for multiple luminance peak values such as for example, 1000, 1500 and 4000 nits, a specific factor $\beta^{-1}(L(i))$ is stored in a LUT for each specific modulation value Ba.

According to a variant, the factor $\beta^{-1}(L(i))$ for a specific modulation value Ba is obtained for a value of a pixel of the final luminance component L by interpolating the luminance peaks between the multiple luminance peaks for which LUT are stored.

According to an embodiment of the step 23, illustrated in FIG. 10, in step 220, a module IFM obtains a first component Y by applying a non-linear function $f^{-1}$ on the final luminance component L in order that the dynamic of the first component Y is increased compared to the dynamic of the final luminance component L:

$$Y = f^{-1}(Ba, L) \quad (A3)$$

The non-linear function $f^{-1}$ is the inverse of the non-linear function f (step 130).

Thus, the embodiments of the function $f^{-1}$ are defined according to the embodiments of the function f.

According to an embodiment, the parameters of the non-linear function $f^{-1}$ (such as a, b, c or γ) and/or the information data Inf is (are) obtained from a local or remote memory (for example a Look-Up-Table) and/or from a bitstream BF as illustrated in FIG. 10.

According to an embodiment, the luminance component L is multiplied by the modulation value Ba after having applied the non-linear function $f^{-1}$:

$$Y = Ba * f^{-1}(L) \quad (A4)$$

According to an embodiment, the non-linear function $f^{-1}$ is the inverse of a gamma function.

The component Y is then given by:

$$Y_1 = \frac{L^{1/\gamma}}{B}$$

where $Y_1$ equals Y or Y/Ba according to the embodiments of eq. (A3) or (A4), B is a constant value, γ is a parameter (real value strictly below 1).

According to an embodiment, the non-linear function $f^{-1}$ is the inverse of a S-Log function. The component $Y_1$ is then given by:

$$Y_1 = \exp^{(\frac{L-c}{a})} - b$$

According to an embodiment, the non-linear function f is the inverse of either a gamma correction or a S Log correction according to the pixel values of the component Y. This is indicated by the information data Inf.

In step 230, a module ILC obtains at least one color component Ec from the first component Y, the two final chrominance components C1, C2, and from a factor r(L) that depends on the final luminance component L. The decoded color picture is then obtained by combining together said at least one color component Ec.

When a general OETF is applied on each intermediate color component E'c (step 171 in FIG. 6), the intermediate components Dc are related to the component Y, the two final chrominance components C1, C2 and the factor r(L):

$$Y = A_1 \begin{bmatrix} E_1 \\ E_2 \\ E_3 \end{bmatrix} = A_1 \begin{bmatrix} E_1' \\ E_2' \\ E_3' \end{bmatrix} / r(L) = \begin{bmatrix} EOTF(D_1) \\ EOTF(D_2) \\ EOTF(D_3) \end{bmatrix} / r(L) \quad (A5a)$$

and $$\begin{bmatrix} C_1 \\ C_2 \end{bmatrix} = \begin{bmatrix} A_2 \\ A_3 \end{bmatrix} \begin{bmatrix} D_1 \\ D_2 \\ D_3 \end{bmatrix} \quad (A5b)$$

where EOTF (Electro-Optical Trans Function) is the inverse of OETF applied in step 171.

Equation (A5b) provides $$\begin{cases} D_2 = \partial_2 D_1 + L_2(C_1, C_2) \\ D_3 = \partial_3 D_1 + L_3(C_1, C_2) \end{cases} \quad (A6)$$

where OETF($E_c$)=$D_c$, $\theta_i$ are constants depending on the matrix A and $L_i$ are linear functions also depending on the matrix A. Then, equation A5a becomes:

$$r(L)*Y = A_{11}EOTF(D_1) + A_{12}EOTF(D_2) + A_{13}EOTF(D_3) \quad (A7)$$

and then $$r(L)*Y = A_{11}EOTF(D_1) + A_{12}EOTF(\theta_2 D_1 + L_2(C_1, C_2)) + A_{13}EOTF(\theta_3 D_1 + L_3(C_1, C_2)) \quad (A8)$$

Equation (A8) is an implicit equation on $D_1$ only. Depending on the expression of the EOTF, equation (A8) can be more or less solved simply. Once solved, $D_1$ is obtained, $D_2$, $D_3$ are deduced from $D_1$ by equation (A6). Then the intermediate color component E'c are obtained by applying the EOTF on the three obtained intermediate components Dc, i.e. E'c=EOTF(Dc).

In this general case, i.e. when a general OETF (does not have any specific property) is applied on each intermediate color component E'c, there exist no analytic solution to equation (8). For instance when the OETF is the ITU-R BT.709/2020 OETF, and the equation (A8) may be solved numerically by using the so-called Newton's method or any other numerical method to find the root of a regular function. However, this leads to highly complex decoders.

In this general case, according to a first embodiment of the step 230, illustrated in FIG. 11*a*, in step 231, a module ILEC obtains three intermediate color component E'c from the first component Y, the two final chrominance components C1, C2 and the factor r(L) as above explained. In step 232, the three color components Ec are obtained by scaling each intermediate color component E'c by the factor r(L):

$$Ec(i) = E'c(i)/r(L(i))$$

where r(L(i)) is the factor given by step 160 that depends on the value of a pixel i of the final luminance component L, $E_c'(i)$ is the value of the pixel i of an intermediate color component E'c, and $E_c(i)$ is the value of the pixel i of the color component Ec.

Actually this order step 231 before step 232 is the inverse of the order step 150 followed by step 170 of the encoding method.

According to a variant of this first embodiment, the OEFT is a square root function and the EOTF is then a square function.

According to another variant of this first embodiment, the OEFT is a cubic root function and the EOTF is then a cubic function.

When the OETF used in step 171, fulfills the commutation condition, namely $$OETF(x*y) = OETF(x)*OETF(y),$$

the component Y and the color components Ec are related by:

$$Y = A_1 \begin{bmatrix} E_1 \\ E_2 \\ E_3 \end{bmatrix} = A_1 \begin{bmatrix} EOTF(F_1) \\ EOTF(F_2) \\ EOTF(F_3) \end{bmatrix} \quad (A9)$$

where Fc are components equal to OETF(Ec) and $$\begin{bmatrix} C_1' \\ C_2' \end{bmatrix} = \begin{bmatrix} C_1 \\ C_2 \end{bmatrix} / OETF(r(L)) =$$

$$\begin{bmatrix} A_2 \\ A_3 \end{bmatrix} \begin{bmatrix} D_1 \\ D_2 \\ D_3 \end{bmatrix} / OETF(r(L)) = \begin{bmatrix} A_2 \\ A_3 \end{bmatrix} \begin{bmatrix} OETF(E_1') \\ OETF(E_2') \\ OETF(E_3') \end{bmatrix} / OETF(r(L)),$$

such that the commutation condition provides $$\begin{bmatrix} C_1' \\ C_2' \end{bmatrix} = \begin{bmatrix} A_2 \\ A_3 \end{bmatrix} \begin{bmatrix} OETF(E_1'/r(L)) \\ OETF(E_2'/r(L)) \\ OETF(E_3'/r(L)) \end{bmatrix} = \begin{bmatrix} A_2 \\ A_3 \end{bmatrix} \begin{bmatrix} OETF(E_1) \\ OETF(E_2) \\ OETF(E_3) \end{bmatrix} = \begin{bmatrix} A_2 \\ A_3 \end{bmatrix} \begin{bmatrix} F_1 \\ F_2 \\ F_3 \end{bmatrix} \quad (A10)$$

Equation (10) provides $$\begin{cases} F_2 = \vartheta_2 F_1 + L_2(C_1', C_2') \\ F_3 = \vartheta_3 F_1 + L_3(C_1', C_2') \end{cases}$$

where $\vartheta_i$ are constants depending on the matrix A and $L_i$ are linear functions also depending on the matrix A.

Then, equation (A9) becomes:

$$Y = A_{11} EOTF(F_1) + A_{12} EOTF(F_2) + A_{13} EOTF(F_3) \quad (A11)$$

and then $$Y = A_{11} EOTF(F_1) + A_{12} EOTF(\vartheta_2 F_1 + L_2(C_1', C_2')) + A_{13} EOTF(\vartheta_3 F_1 + L_3(C_1', C_2')) \quad (A12)$$

When the OETF fulfills the commutation conditions, according to a second embodiment of the step 230, illustrated in FIG. 11*b*, in step 232, two intermediate components C'1 and C'2 are obtained by scaling the two final chrominance components C1 and C2 by the factor OEFT(r(L(i))) where OETF is the function used in step 171 in FIG. 6:

$$C'1(i) = \frac{C1(i)}{OETF(r(L(i)))}$$

$$C'2(i) = \frac{C2(i)}{OETF(r(L(i)))}$$

where r(L(i)) is the factor given by step 160 that depends on the value of a pixel i of the final luminance component L, $C_1'(i)$, $C_2'(i)$ is respectively the value of the pixel i of the component C'1 and C'2, $C_1(i)$, $C_2(i)$ is respectively the value of the pixel i of the two final chrominance components C1 and C2.

In step 231, a module ILEC obtains the three color components Ec from the first component Y and the two intermediate chrominance components C'1, C'2 as above explained.

According to a variant of this second embodiment, the OEFT is a square root function and the EOTF is then a square function. Then, in step 232 in FIG. 11*b*, the two intermediate components C'1 and C'2 are obtained by scaling the two final chrominance components C1 and C2 by the factor $\sqrt{r(L(i))}$ $$C'1(i) = \frac{C1(i)}{OETF(r(L(i)))} = \frac{C1(i)}{\sqrt{r(L(i))}}$$

$$C'2(i) = \frac{C2(i)}{OETF(r(L(i)))} = \frac{C2(i)}{\sqrt{r(L(i))}}$$

Equation (9) becomes:

$$Y = A_1 \begin{bmatrix} E_1 \\ E_2 \\ E_3 \end{bmatrix} = A_1 \begin{bmatrix} F_1^2 \\ F_2^2 \\ F_3^2 \end{bmatrix} \quad (A11)$$

and $$\begin{bmatrix} C'_1 \\ C'_2 \end{bmatrix} = \begin{bmatrix} C_1 \\ C_2 \end{bmatrix} / \sqrt{r(L)} =$$

$$\begin{bmatrix} A_2 \\ A_3 \end{bmatrix} \begin{bmatrix} D_1 \\ D_2 \\ D_3 \end{bmatrix} / \sqrt{r(L)} = \begin{bmatrix} A_2 \\ A_3 \end{bmatrix} \begin{bmatrix} \sqrt{E_1} \\ \sqrt{E_2} \\ \sqrt{E_3} \end{bmatrix} / \sqrt{r(L)}$$

such that the commutation provides $$\begin{bmatrix} C'_1 \\ C'_2 \end{bmatrix} = \begin{bmatrix} A_2 \\ A_3 \end{bmatrix} \begin{bmatrix} \sqrt{E'_1/r(L)} \\ \sqrt{E'_2/r(L)} \\ \sqrt{E'_2/r(L)} \end{bmatrix} = \begin{bmatrix} A_2 \\ A_3 \end{bmatrix} \begin{bmatrix} \sqrt{E_1} \\ \sqrt{E_2} \\ \sqrt{E_3} \end{bmatrix} = \begin{bmatrix} A_2 \\ A_3 \end{bmatrix} \begin{bmatrix} F_1 \\ F_2 \\ F_3 \end{bmatrix} \quad \text{(A12)}$$

Equation (11) becomes:

$$Y = A_{11}F_1^2 + A_{12}F_2^2 + A_{13}F_3^2 \quad \text{(A13) and}$$

$$Y = A_{11}F_1^2 + A_{12}(\vartheta_2 F_1 + L_2(C'_1, C'_2)) + A_{13}(\vartheta_3 F_1 + L_3(C'_1, C'_2))^2 \quad \text{(A14)}$$

Equation (A14) is a second order equation that may be solved analytically. This analytic solution leads to a specific embodiment of the step 231 as illustrated in FIG. 12. This embodiment is advantageous because it allows an analytic expression of the EOTF (inverse of the OETF) and thus of the decoded components of the picture. Moreover, the EOTF is then the square function that is a low complexity process at the decoding side. In step 2310, a module SM obtains a second component S by combining together the two intermediate chrominance components C'1, C'2 and the first component Y:

$$S = Y + k_0 C'^2_1 + k_1 C'^2_2 k_2 C'_1 C'_2$$

where $k_0$, $k_1$ and $k_2$ parameters values and means the square of a component $C'_c$ (c=1 or 2).

In step 2311, a module LC2 obtains the three solver components Fc by linearly combining together the intermediate chrominance component C'1, C'2 and a second component S:

$$\begin{bmatrix} F_1 \\ F_2 \\ F_3 \end{bmatrix} = C \begin{bmatrix} S \\ C'_1 \\ C'_2 \end{bmatrix}$$

where C is a 3×3 matrix defined as the inverse of the matrix A.

In step 2312, the three color components Ec are obtained by taking the square of each intermediate color components (Dc):

$$\begin{bmatrix} E_1 \\ E_2 \\ E_3 \end{bmatrix} = \begin{bmatrix} EOTF(F_1) \\ EOTF(F_2) \\ EOTF(F_3) \end{bmatrix} = \begin{bmatrix} (F_1)^2 \\ (F_2)^2 \\ (F_3)^2 \end{bmatrix}$$

The matrix A determines the transform of the picture I to be encoded from the color space (E1, E2, E3), in which the pixel values of the picture to be encoded are represented, to the color space (Y, C1, C2).

Such a matrix depends on the gamut of the color picture to be encoded. For example, when the picture to be encoded is represented in the BT709 gamut as defined by ITU-R Rec. 709, the matrix A is given by:

$$A = \begin{bmatrix} 0.2126 & 0.7152 & 0.0722 \\ -0.1446 & -0.3854 & 0.5 \\ 0.5 & -0.4541 & 0.0459 \end{bmatrix}$$

and the matrix C is given by:

$$C = \begin{bmatrix} 1 & 0 & 1.5748 \\ 1 & -0.1874 & -0.4681 \\ 1 & 1.8556 & 0 \end{bmatrix}$$

According to a variant of this second embodiment, the OEFT is a cube root function and the EOTF is then a cubic function. Then, in step 232 in FIG. 11b, the two intermediate components C'1 and C'2 may then be obtained by scaling the two final chrominance components C1 and C2 by the factor $$\sqrt[3]{r(L(i))}:$$

$$C'1(i) = \frac{C1(i)}{\sqrt[3]{r(L(i))}}$$

$$C'2(i) = \frac{C2(i)}{\sqrt[3]{r(L(i))}}:$$

The EOTF is then a cubic function thus leading to an equation (14) on $F_1$ being a more complex third order equation which can be solved analytically by the so-called Cardano's method.

Very complex analytic solutions also exist for the fourth order equation (Ferrari's method), but not anymore for an order higher or equal to five as stated by the Abel-Ruffini theorem.

The decoder DEC is configured to decode data which have been encoded by the encoder ENC.

The encoder ENC (and decoder DEC) is not limited to a specific encoder (decoder) but when an entropy encoder (decoder) is required, an entropy encoder such as a Huffmann coder, an arithmetic coder or a context adaptive coder like Cabac used in H264/AVC or HEVC is advantageous.

The encoders ENC (and decoder DEC) is not limited to a specific encoder which may be, for example, an frame/video legacy coder with loss like JPEG, JPEG2000, MPEG2, H264/AVC or HEVC.

On FIG. 1-12, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

FIG. 13 represents an exemplary architecture of a device 1300 which may be configured to implement a method described in relation with FIG. 1-12.

Device 1300 comprises following elements that are linked together by a data and address bus 1301:
- a microprocessor 1302 (or CPU), which is, for example, a DSP (or Digital Signal Processor);
- a ROM (or Read Only Memory) 1303;
- a RAM (or Random Access Memory) 1304;
- an I/O interface 1305 for transmission and/or reception of data, from an application; and
- a battery 1306

According to a variant, the battery 1306 is external to the device. Each of these elements of FIG. 13 are well-known by those skilled in the art and won't be disclosed further. In each of mentioned memory, the word «register» used in the specification can correspond to area of small capacity (some bits) or to very large area (e.g. a whole program or large amount of received or decoded data). ROM 1303 comprises at least a program and parameters. Algorithm of the methods according to the disclosure is stored in the ROM 1303. When switched on, the CPU 1302 uploads the program in the RAM and executes the corresponding instructions.

RAM 1304 comprises, in a register, the program executed by the CPU 1302 and uploaded after switch on of the device 1300, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, the color picture I is obtained from a source. For example, the source belongs to a set comprising:
- a local memory (1303 or 1304), e.g. a video memory or a RAM (or Random Access Memory), a flash memory, a ROM (or Read Only Memory), a hard disk
- a storage interface, e.g. an interface with a mass storage, a RAM, a flash memory, a ROM, an optical disc or a magnetic support;
- a communication interface (1305), e.g. a wireline interface (for example a bus interface, a wide area network interface, a local area network interface) or a wireless interface (such as a IEEE 802.11 interface or a Bluetooth® interface); and
- a picture capturing circuit (e.g. a sensor such as, for example, a CCD (or Charge-Coupled Device) or CMOS (or Complementary Metal-Oxide-Semiconductor)).

According to different embodiments of the decoding or decoder, the decoded picture is sent to a destination; specifically, the destination belongs to a set comprising:
- a local memory (1303 or 1304), e.g. a video memory or a RAM (or Random Access Memory), a flash memory, a ROM (or Read Only Memory), a hard disk
- a storage interface, e.g. an interface with a mass storage, a RAM, a flash memory, a ROM, an optical disc or a magnetic support;
- a communication interface (1305), e.g. a wireline interface (for example a bus interface, a wide area network interface, a local area network interface) or a wireless interface (such as a IEEE 802.11 interface or a Bluetooth® interface); and
- a display.

According to different embodiments of encoding or encoder, the bitstream BF and/or F are sent to a destination. As an example, one of bitstream F and BF or both bitstreams F and BF are stored in a local or remote memory, e.g. a video memory (1304) or a RAM (1304), a hard disk (1303). In a variant, one or both bitstreams are sent to a storage interface, e.g. an interface with a mass storage, a flash memory, ROM, an optical disc or a magnetic support and/or transmitted over a communication interface (1305), e.g. an interface to a point to point link, a communication bus, a point to multipoint link or a broadcast network.

According to different embodiments of decoding or decoder, the bitstream BF and/or F is obtained from a source. Exemplarily, the bitstream is read from a local memory, e.g. a video memory (1304), a RAM (1304), a ROM (1303), a flash memory (1303) or a hard disk (1303). In a variant, the bitstream is received from a storage interface, e.g. an interface with a mass storage, a RAM, a ROM, a flash memory, an optical disc or a magnetic support and/or received from a communication interface (1305), e.g. an interface to a point to point link, a bus, a point to multipoint link or a broadcast network.

According to different embodiments, device 1300 being configured to implement an encoding method described in relation with FIG. 2-7, belongs to a set comprising:
- a mobile device
- a communication device
- a game device
- a tablet (or tablet computer)
- a laptop
- a still picture camera;
- a video camera
- an encoding chip;
- a still picture server and
- a video server (e.g. a broadcast server, a video-on-demand server or a web server).

According to different embodiments, device 1300 being configured to implement a decoding method described in relation with FIG. 8-12, belongs to a set comprising:
- a mobile device
- a communication device
- a game device
- a set top box;
- a TV set;
- a tablet (or tablet computer)
- a laptop
- a display and
- a decoding chip.

According to an embodiment illustrated in FIG. 14, in a transmission context between two remote devices A and B over a communication network NET, the device A comprises means which are configured to implement a method for encoding an picture as described in relation with the FIG. 2-7 and the device B comprises means which are configured to implement a method for decoding as described in relation with FIG. 8-12.

According to a variant of the disclosure, the network is a broadcast network, adapted to broadcast still pictures or video pictures from device A to decoding devices including the device B.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining two further chrominance components by scaling two chrominance components of a color picture by a factor coefficient based on pixel values of a luminance component of the color picture;
calculating a further luminance component by adding the luminance component and the two further chrominance components; and
encoding the further luminance component and the two further chrominance components.

2. The method of claim 1, wherein adding the luminance component and the two further chrominance components comprises linearly combining the two further chrominance components.

3. The method of claim 2, wherein the method further comprises at least one of:
storing coefficients m and n used by the linearly combining in either a local or remote memory; and
adding the coefficients m and n to a bitstream.

4. The method of claim 1, wherein the factor coefficient is obtained from a Look-Up Table for a specific pixel value of the luminance component.

5. The method of the claim 1, wherein the factor coefficient for a specific pixel value of the luminance component is obtained by interpolating values of a Look-Up Table.

6. The method of claim 3, wherein the factor coefficient further depends on the coefficients m and n.

7. The method of the claim 1, wherein the factor coefficient is obtained such that a gamut distortion, calculated between a gamut of colors obtained from the further luminance and chrominance components and a gamut of the colors of the color picture to be encoded, is lowered.

8. The method of claim 1, wherein obtaining a luminance component and two chrominance components from the color picture to be encoded comprises:
obtaining a luminance component comprising:
obtaining a modulation value from the luminance of the color picture;
obtaining a scaled luminance by dividing the luminance of the color picture by the modulation value;

obtaining the luminance component by applying a non-linear function on the scaled luminance in order that the dynamic of the luminance component is reduced compared to the dynamic of the scaled luminance;

obtaining two chrominance components by:
  obtaining a second factor that depends on the value of the pixel of the luminance component and the luminance value of the co-located pixel in the color picture;
  obtaining at least one intermediate color component by multiplying each color component by the second factor; and
  obtaining the two chrominance components from the at least one intermediate color component.

9. A method comprising:
calculating a further luminance component by adding a luminance component and two chrominance components obtained from a bitstream;
obtaining two further chrominance components by scaling the two chrominance components by a factor coefficient based on pixel values of the further luminance component; and
obtaining a color picture from the further luminance component and the two further chrominance components.

10. The method of claim 9, wherein adding the luminance component and the two chrominance components comprises linearly combining the two chrominance components.

11. The method of claim 9, wherein the method further comprises obtaining coefficients m and n used by the linearly combining either from a bitstream or from a local or remote memory.

12. The method of claim 9, wherein the factor coefficient is obtained from a Look-Up Table for a specific pixel value of the luminance component.

13. The method of the claim 9, wherein the factor coefficient for a specific pixel value of the luminance component is obtained by interpolating values of a Look-Up Table.

14. The method of claim 11, wherein the factor coefficient further depends on the coefficients m and n.

15. The method of claim 9, wherein obtaining the color picture from the further luminance component and the two further chrominance components comprises:
obtaining a first component comprising:
  obtaining a resulting component by applying a non-linear function on the further luminance component in order that the dynamic of the resulting component is increased compared to the dynamic of the further luminance component;
  obtaining a modulation value from the luminance of the color picture to be decoded;
  obtaining the first component by multiplying the resulting component by the modulation value;
obtaining a second factor that depends on the value of the pixel of the further luminance component;
obtaining at least one color component from the first component, the two further chrominance components, and the second factor; and
forming a decoded picture by combining the at least one color component.

16. An apparatus comprising a memory having stored instructions for causing a processor to:
obtain two further chrominance components by scaling two chrominance components of a color picture by a factor coefficient based on pixel values of a luminance component of the color picture;
calculate a further luminance component by adding the luminance component and the two further chrominance components; and
encode the further luminance component and the two further chrominance components.

17. The apparatus of claim 16, wherein adding the luminance component and the two further chrominance components comprises linearly combining the two further chrominance components.

18. The apparatus of claim 17, wherein the apparatus further comprises at least one of:
storing coefficients m and n used by the linearly combining in either a local or remote memory; and
adding the coefficients m and n to a bitstream.

19. The apparatus of claim 16, wherein the factor coefficient is obtained from a Look-Up Table for a specific pixel value of the luminance component.

20. The apparatus of the claim 16, wherein the factor coefficient for a specific pixel value of the luminance component is obtained by interpolating values of a Look-Up Table.

21. The apparatus of claim 18, wherein the factor coefficient further depends on the coefficients m and n.

22. The apparatus of the claim 16, wherein the factor coefficient is obtained such that a gamut distortion, calculated between a gamut of colors obtained from the further luminance and chrominance components and a gamut of the colors of the color picture to be encoded, is lowered.

23. The apparatus of claim 16, wherein obtaining a luminance component and two chrominance components from the color picture to be encoded comprises:
obtaining a luminance component comprising:
  obtaining a modulation value from the luminance of the color picture;
  obtaining a scaled luminance by dividing the luminance of the color picture by the modulation value;
  obtaining the luminance component by applying a non-linear function on the scaled luminance in order that the dynamic of the luminance component is reduced compared to the dynamic of the scaled luminance;
obtaining two chrominance components by:
  obtaining a second factor that depends on the value of the pixel of the luminance component and the luminance value of the co-located pixel in the color picture;
  obtaining at least one intermediate color component by multiplying each color component by the second factor; and
  obtaining the two chrominance components from the at least one intermediate color component.

24. The apparatus of claim 16, further comprising a transmission element communicatively coupled to the processor to transmit the encoded further luminance component and the encoded two further chrominance components.

25. An apparatus comprising a memory having stored instructions for causing a processor to:
calculate a further luminance component by adding a luminance component and two chrominance components obtained from a bitstream;
obtain two further chrominance components by scaling the two chrominance components by a factor coefficient based on pixel values of the further luminance component; and
obtain a color picture from the further luminance component and the two further chrominance components.

26. The apparatus of claim 25, wherein adding the luminance component and the two chrominance components comprises linearly combining the two chrominance components.

27. The apparatus of claim 25, wherein the method further comprises obtaining coefficients m and n used by the linearly combining either from a bitstream or from a local or remote memory.

28. The apparatus of claim 25, wherein the factor coefficient is obtained from a Look-Up Table for a specific pixel value of the luminance component.

29. The apparatus of the claim 25, wherein the factor coefficient for a specific pixel value of the luminance component is obtained by interpolating values of a Look-Up Table.

30. The apparatus of claim 27, wherein the factor coefficient further depends on the coefficients m and n.

31. The apparatus of claim 25, wherein obtaining the color picture from the further luminance component and the two further chrominance components comprises:

obtaining a first component comprising:
    obtaining a resulting component by applying a non-linear function on the further luminance component in order that the dynamic of the resulting component is increased compared to the dynamic of the further luminance component;
    obtaining a modulation value from the luminance of the color picture to be decoded;
    obtaining the first component by multiplying the resulting component by the modulation value;
obtaining a second factor that depends on the value of the pixel of the further luminance component;
obtaining at least one color component from the first component, the two further chrominance components, and the second factor; and
forming a decoded picture by combining the at least one color component.

32. The apparatus of claim 25, further comprising a display communicatively coupled to the processor to receive and display the color picture.

\* \* \* \* \*

UNITED STATES PATENT AND TRADEMARK OFFICE
CERTIFICATE OF CORRECTION

PATENT NO. : 11,178,412 B2
APPLICATION NO. : 16/408639
DATED : November 16, 2021
INVENTOR(S) : Sebastien Lasserre et al.

It is certified that error appears in the above-identified patent and that said Letters Patent is hereby corrected as shown below:

In the Specification

Column 8, Line 1; Column 8, Line 4; and Column 8, Line 6: replace "W" with --W'--
Column 8, Line 51; and Column 17, Line 43: replace "and." with --.--

Column 9, Line 44: replace "$S_{Y_0}=[\mu(R_{Y_0})\mu(G_{Y_0})\mu(B_{Y_0})]$" with --$S_{Y_0}=[\mu(R_{Y_0})\ \mu(G_{Y_0})\ \mu(B_{Y_0})]$--

Column 11, Line 42: replace "matrix t" with --matrix $\Phi_0$--

Column 12, Line 2; Column 12, Line 16; and Column 12, Line 18: replace "(xj,yj)" with --$(x_j,y_j)$--
Column 12, Line 3; and Column 12, Line 14: replace "(x'j,y'j)" with --$(x'_j,y'_j)$--
Column 12, Line 4: replace "Y0" with --$Y_0$--
Column 12, Line 9: replace "Ba0" with --$Ba_0$--

Column 13, Line 12: replace "Y" with --$\gamma$--
Column 13, Line 53: replace "EC" with --Ec--

Column 14, Line 3: replace "$E_c'+$" with --$E_c'(i)$--

Column 18, Line 44: insert --$A_1$-- after "r(L)="
Column 18, Line 59: replace "$\theta_i$" with --$\vartheta_i$--
Column 18, Line 66: replace "$\theta_2$" with --$\vartheta_2$--
Column 18, Line 67; and Column 21, Line 26: replace "$\theta_3$" with --$\vartheta_3$--

Column 20, Line 6: replace "C'$_2$" with --C'$_2$--

Column 21, Line 40: replace "$S=Y+k_0C'^2_1+k_1C'^2_2 k_2C'_1C'_2$" with
--$S = \sqrt{Y + k_0 C'^2_1 + k_1 C'^2_2 + k_2 C'_1 C'_2}$--

Signed and Sealed this
First Day of November, 2022

Katherine Kelly Vidal
*Director of the United States Patent and Trademark Office*

Column 26, Line 50; Column 26, Line 55; and Column 27, Line 37: replace "the claim" with --claim--

Column 28, Line 19; Column 28, Line 25; and Column 29, Line 12: replace "the claim" with --claim--